UNITED STATES PATENT OFFICE.

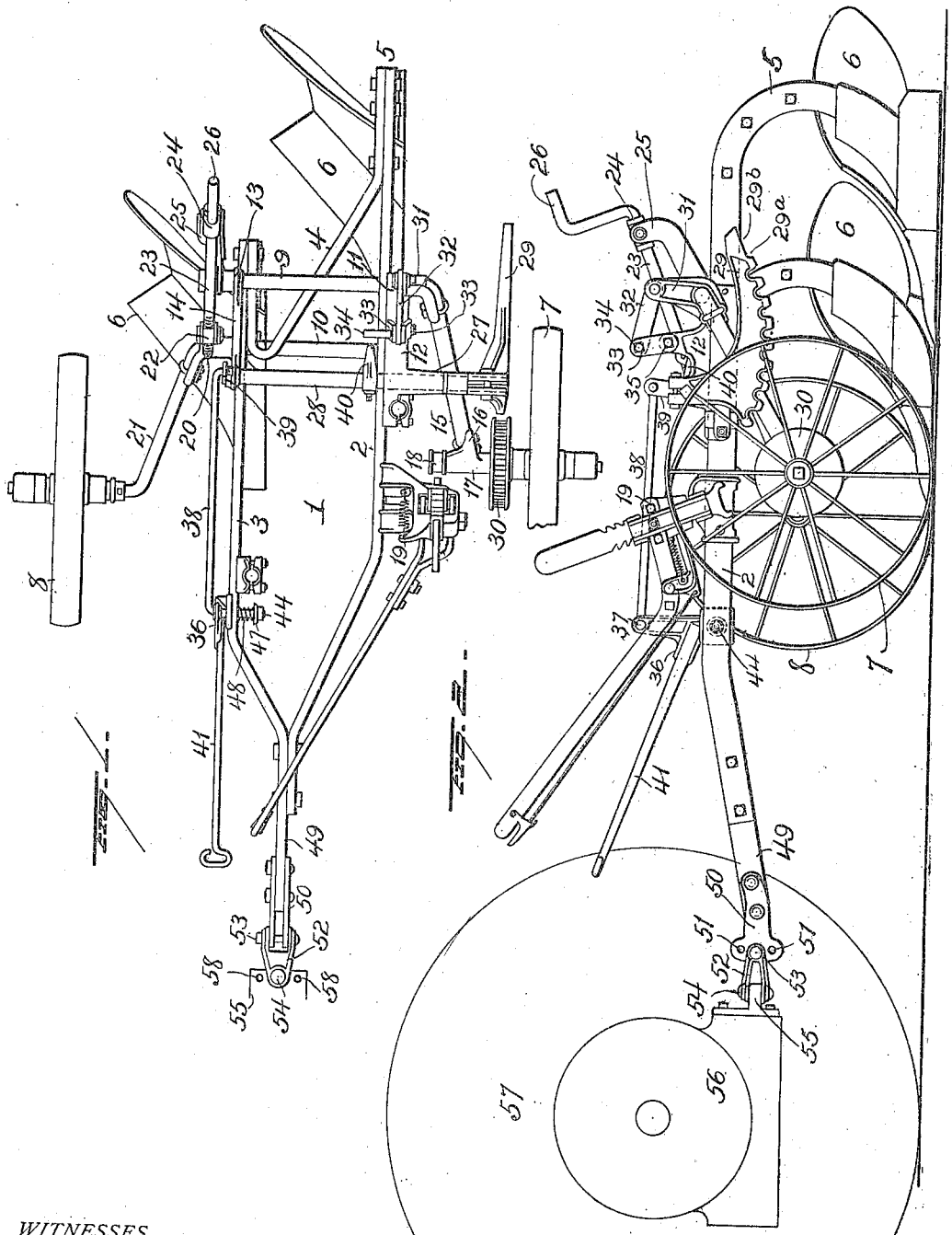

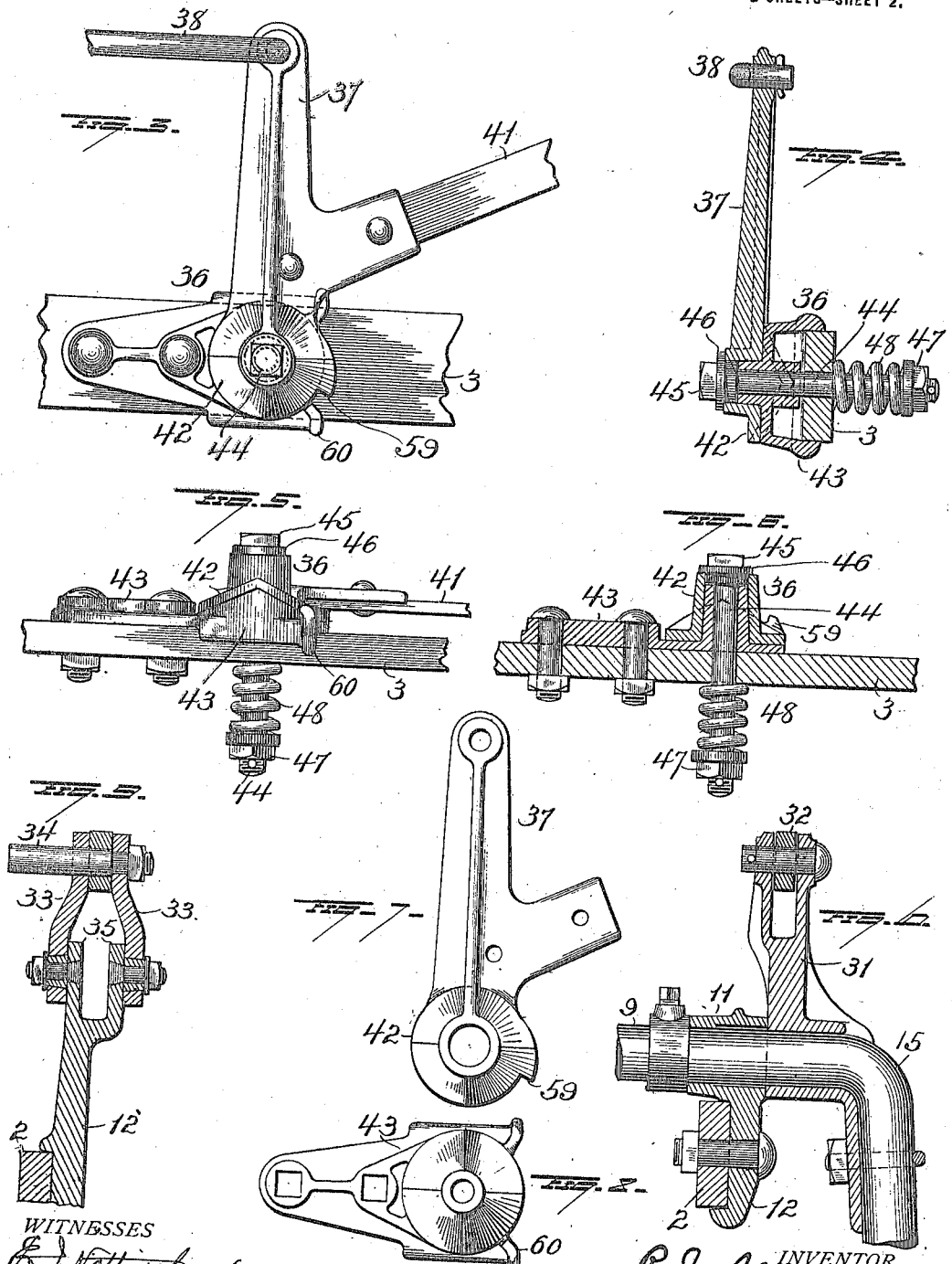

RUDOLPH JOSEPH ALTGELT, OF SOUTH BEND, INDIANA, ASSIGNOR TO OLIVER CHILLED PLOW WORKS, OF SOUTH BEND, INDIANA.

PLOW STRUCTURE.

1,266,752.

Specification of Letters Patent. Patented May 21, 1918.

Application filed September 29, 1917. Serial No. 193,968.

*To all whom it may concern:*

Be it known that I, RUDOLPH J. ALTGELT, a citizen of the United States, and a resident of South Bend, in the county of St. Joseph and State of Indiana, have invented certain new and useful Improvements in Plow Structures; and I do hereby declare the following to be a full, clear, and exact description of the invention, such as will enable others skilled in the art to which it appertains to make and use the same.

This invention relates to improvements in plow structures and more particularly to those with which a tractor is employed as the draft means and known in the art as "engine gang plows."

One object of my present invention is to so construct a plow structure of the type specified and connect it directly with the tractor or wheeled draft means in such manner, that the rear portion of the plow structure shall be supported on carrying wheels and capable of being raised or lowered and of swinging laterally while the wheeled draft frame or tractor is being turned either to the right or the left.

With this and other objects in view, the invention consists in certain novel features of construction and combinations of parts as hereinafter set forth and pointed out in the claims.

In the accompanying drawings; Figure 1 is a plan view of an engine gang plow structure embodying my improvements; Fig. 2 is a side elevation of the same, and Figs. 3, 4, 5, 6, 7, 8, 9 and 10 are views of details.

1 represents a plow frame comprising a plurality of plow beams, 2, 3 (two such beams being shown in the drawing, although a greater number may be employed) connected and held properly spaced apart by a diagonal brace 4. The plow beams are provided at their rear ends with standards 5 to which plow bases 6 are secured. The beams 2, 3 with the standards 5 and bases 6 thus constitute a plow structure, and its rear portion is supported by land and furrow wheels 7 and 8 through the medium of crank axles 9 and 10.

The crank axle 9 is mounted in a bearing 11 on a bracket 12 secured to the beam 2 and in a bearing 13 on a bracket 14 secured to the beam 3 while the axle 10 is mounted in the bracket 14 and also in the bracket 12.

The crank 15 of the axle 9 is secured to an arm 16 on a sleeve or sand band 17 in which the spindle of the land wheel 7 is mounted. The inner end of the sleeve or sand band is provided with annular flanges whereby a head 18 is formed and this head is in position to be engaged by a member of a manually operable mechanism 19 for raising the plow and adjusting the same for depth of plowing.

A bracket 20 is secured to the axle 10 at the juncture of its crank 21 therewith and is provided with a threaded member 22 through which the threaded portion of a shaft 23 passes,—said shaft also passing through a sleeve 24 pivotally mounted in the bifurcated end of an arm 25 secured to the end of the axle 9. The shaft is provided with a crank or handle 26 for turning the same to effect adjustment of the plow structure for leveling the same.

The bracket 12 is provided with a sleeve 27 which constitutes a bearing for one end of a transverse shaft 28,—the other portion of said shaft having a bearing in the end of said shaft having a bearing in the bracket 14 secured to the beam 3. The shaft 28 projects beyond its bearing in the bracket 12 and has secured thereto, one end of a curved or segmental rack 29 which is adapted to be moved into mesh with a gear 30 rotatable with the carrying wheel 7. The rack 29 is provided near its free end with a shallow notch 29$^a$ and a beveled face 29$^b$ which operate to cause the rack to move out of mesh with the teeth of the gear when said rack shall have completed its throw to effect the lifting of the plow structure.

It will be observed that the mounting of the segmental rack is in rear of the axis of the carrying wheel 7 and the gear 30 and in front of the mountings of the crank axles on the beams of the plow structure. When the rack is brought into engagement with the gear, the turning of the latter with the carrying wheel 7 will cause the rear portion of the plow structure to be raised and as the rack engages the gear behind the latter and in front of the mountings of the crank axles, the tendency will be to force the rack toward the gear and thus insure the positive mesh of the rack with the gear throughout the full throw of the former.

A bracket 31 is secured to and moves with the axle 9 adjacent to the mounting of the latter on the bracket 12. This bracket projects upwardly and in its bifurcated upper end, one end of a bar 32 is pivotally connected. The forward end of this bar is pivotally connected with and between the upper ends of links 33 by means of a pin 34, one end of which projects laterally beyond one of said links, and the lower ends of the latter are pivotally attached to spaced lugs 35 which project upwardly from an intermediate portion of the bracket 12.

When the plows are in working position, the segmental rack will be held in raised position by means of a spring-pressed cam device 36 mounted on the beam 3. This cam latch device includes a pivotally mounted arm 37, to which one end of a rod 38 is connected,—the other end of said rod being pivotally attached to an arm 39 secured to the transverse shaft 28, and to the latter, a trip arm 40 is secured. A hand lever 41 is secured to the pivoted arm 37 of the latch device.

In constructing the cam latch device 36, the lower end of the arm 37 is formed with a cam head 42 having cam faces disposed at an obtuse angle to each other, to engage similarly shaped cam faces on a block 43 secured to the beam 3. A pivot pin 44 passes centrally through the cam head 42, and through the block 43, said pin also passing transversely through the beam 3 and beyond the same. One end of the pivot pin 44 may be provided with a head 45 which bears against a ring or washer 46 disposed between the same and the cam head of the arm 37, and the other end of said pin is threaded to receive a nut 47. Between the nut 47 and the beam 3, a spring 48 is located and tends normally to press the cam faces of the head 42 against the cam faces of the block 43. The engagement of these cam faces serve, (by reason of the connections between the arm 37 and the transverse shaft 28) to hold the segmental bar latched in elevated position, as shown in Fig. 2, and also, in conjunction with the spring 48, to press the rack against the gear, as hereinafter explained.

The forward ends of the beams 2, 3 are brought together and securely bolted and one of said beams is made with an extension 49, to the forward end of which, two plates forming a clevis 50 are secured,— said clevis plates being each provided with a plurality of holes 51 whereby the rear jaws of a shackle 52 may be adjustably pivoted to clevis by means of a horizontal pin 53. The forward jaws of the shackle are disposed one above the other and at right angles to the rear jaws of said shackle and are perforated for the accommodation of a vertical pivot pin 54, which serves to pivotally connect said shackle directly to a bracket or projection 55 rigid with the rear axle mounting 56 of a tractor 57. The bracket or projection 55 may be provided with a plurality of perforations 58 in horizontal alinement whereby the connection of the shackle which couples the clevis of the plow structure to the tractor may be adjusted laterally.

By means of the connecting devices above described, the plow structure is so connected directly with the tractor that its rear portion may be raised and lowered and so that it may swing laterally to accurately follow the trail of the tractor.

When the plows are in working position, and the operator desires to raise the plow structure with the use of the power lift mechanism, he will move the lever 41 upwardly from the position shown in Fig. 2. This will cause the arm 37 of the latch devices to turn against the resistance of the spring-pressed cam faces and motion will be imparted by the rod 38 and arm 39 to turn the transverse shaft 28 and thus swing the segmental rack 29 into mesh with the gear 30. When the rack shall have been thus moved into mesh with the gear, the cam faces on the head of arm 37 will have moved sufficiently with relation to the cam faces on the block 43 to cause the rack to be held against the segment with a yielding pressure afforded by the action of the spring 48. As the plow moves forwardly, motion will be imparted to the rack 29 by the gear 30 and thus cause the plow structure to be raised, its forward end pivoting on the pin 53. As the plow structure approaches the end of its upward movement and a tooth of a gear enters the shallow notch and engages the beveled face at the free end of the rack, the latter will be forced out of mesh with the gear, as previously stated and the rack may then be permitted to move to the position shown in Fig. 2, and be held there, by the action of the spring-pressed cam latch devices.

During the raising of the plow structure by the power lift mechanism, the crank axle 9 will turn in its bearings and the bracket 31 will move forwardly. As the bracket 31 thus moves, it will cause the bar 32 to also move forwardly and the links 33 to turn on their pivotal connection with the bracket 12, until said bar becomes disposed in the notch or recess afforded by the lugs 35. The pivot pin 34 which connects the bar 32 with the links 33 will now have moved beyond a line passing through the pivotal connection of the links 33 to the lugs 35 and the pivotal connection of the bar 32 with the bracket 31, and the plow structure will thus be locked in its raised position.

When the parts are in the locked-up position, the projecting end of the pin 34 will be disposed over the arm 40 on the transverse shaft 28. A short downward movement of the hand lever 41 will now cause a forward movement of the arm 37 (limited by stop lugs 59—60 on the cam head 42 and cam block 43 respectively), and motion will be imparted through the rod 38 and arm 39 to the transverse shaft 28, so as to turn said shaft slightly in a direction to raise the trip arm 40 and cause it to engage the projecting pin 34 and move the same upwardly far enough to break the lock above described. The plow structure may now descend by gravity to the position shown in Fig. 2 with the plow bases ready to enter the ground.

I do not claim, in this case, the means employed for locking the plow structure in its raised position and for releasing the same to permit it to descend to working position, the same being covered by my copending application Serial No. 193,969,—nor do I claim, in this case, the manually operable mechanism for raising the plow structure and adjusting it for depth of plowing, the same being covered by my copending application Serial No. 193,970.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. The combination with a plow structure and means for connecting the forward end of said plow structure with draft means, of crank axles mounted on the plow structure, carrying wheels on said crank axles, a gear carried by one of said wheels, a rack mounted on the plow structure, a spring-pressed cam device connected with said rack and operating normally to hold the same out of mesh with the gear and also operating to press the same toward the gear during the operation of raising the plow structure, and means for manually operating said spring-pressed cam device.

2. The combination with a plow structure and means for connecting its forward end to draft means, of crank axles mounted on said plow structure, carrying wheels on said crank axles, a gear carried by one of said wheels, a transverse shaft mounted on the plow structure, a segmental rack secured to said transverse shaft to coöperate with said gear, an arm on the transverse shaft, an arm having pivotal mounting on the plow structure, contacting cam devices interposed between said last-mentioned arm and the plow structure, a spring pressing said cam devices toward each other, a hand lever secured to said last-mentioned arm, and a rod connecting said last-mentioned arm with the arm on the transverse shaft.

3. The combination with a plow structure, means for pivotally connecting the forward end of the same to draft means, crank axles mounted on the plow structure, carrying wheels on said crank axles, and a gear connected with one of said wheels, of a shaft mounted on the plow structure, a segmental rack secured to said shaft, a spring-pressed cam device connected with said shaft and acting as latch means normally holding the segmental rack elevated, means for operating said cam device to lower the rack into mesh with the gear and permit it to press the rack toward the gear, said segmental rack having a shallow notch and a beveled face near its free end for disengaging said rack from the gear and resetting the cam device to cause it to return said rack to elevated position.

In testimony whereof, I have signed this specification in the presence of two subscribing witnesses.

RUDOLPH JOSEPH ALTGELT.

Witnesses:
EDWIN NICAR,
CHARLES A. WEBSTER.